United States Patent
Umamine

(10) Patent No.: US 12,001,130 B2
(45) Date of Patent: *Jun. 4, 2024

(54) LIGHT SOURCE UNIT AND PROJECTOR

(71) Applicant: CASIO COMPUTER CO., LTD., Tokyo (JP)

(72) Inventor: Osamu Umamine, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,217

(22) Filed: Aug. 29, 2022

(65) Prior Publication Data
US 2022/0413374 A1    Dec. 29, 2022

Related U.S. Application Data

(63) Continuation of application No. 17/010,437, filed on Sep. 2, 2020, now Pat. No. 11,460,763.

(30) Foreign Application Priority Data

Sep. 3, 2019  (JP) ................................ 2019-160037
Dec. 20, 2019 (JP) ................................ 2019-230553

(51) Int. Cl.
*G03B 21/20* (2006.01)
*G02B 26/08* (2006.01)
(Continued)

(52) U.S. Cl.
CPC ....... *G03B 21/204* (2013.01); *G02B 26/0816* (2013.01); *G02B 27/102* (2013.01);
(Continued)

(58) Field of Classification Search
CPC ....... F21V 9/20; G03B 21/2013; G03B 33/12; G03B 21/2066; G03B 21/208; G02B 27/14

See application file for complete search history.

(56) References Cited

U.S. PATENT DOCUMENTS

2008/0225238 A1*  9/2008  Yanagisawa ......... G03B 21/005
                                                         353/31
2011/0292349 A1   12/2011  Kitano et al.
(Continued)

FOREIGN PATENT DOCUMENTS

JP   H06-281880 A   10/1994
JP   10-097012 A    4/1998
(Continued)

OTHER PUBLICATIONS

JPO; Application No. 2021-202029; Notice of Reason for Refusal dated Oct. 3, 2023.

*Primary Examiner* — William J Carter
(74) *Attorney, Agent, or Firm* — Fitch, Even, Tabin & Flannery LLP

(57) ABSTRACT

A light source unit includes a first light source configured to emit light in a first wavelength range, a second light source configured to emit light in a first wavelength range, a first dichroic mirror configured to reflect the light in the second wavelength range incident thereon at a first incident angle and transmit the light in the second wavelength range incident thereon at a second incident angle, which is different from the first incident angle, and a second dichroic mirror configured to reflect the light in the second wavelength range that has passed through the first dichroic mirror, wherein after having been reflected by the second dichroic mirror, the light in the second wavelength range is incident on the first dichroic mirror at the first incident angle to then be reflected by the first dichroic mirror.

16 Claims, 6 Drawing Sheets

(51) Int. Cl.
*G02B 27/10* (2006.01)
*G02B 27/14* (2006.01)

(52) U.S. Cl.
CPC ....... *G02B 27/141* (2013.01); *G03B 21/2073* (2013.01); *G03B 21/208* (2013.01)

(56) References Cited

U.S. PATENT DOCUMENTS

| | | |
|---|---|---|
| 2012/0127435 A1 | 5/2012 | Kitano et al. |
| 2012/0140183 A1 | 6/2012 | Tanaka et al. |
| 2012/0242912 A1* | 9/2012 | Kitano ................ F21V 9/08 |
| | | 362/19 |
| 2012/0268503 A1 | 10/2012 | Sugiyama et al. |
| 2012/0268917 A1 | 10/2012 | Kitano et al. |
| 2012/0299801 A1 | 11/2012 | Kitano |
| 2012/0300178 A1* | 11/2012 | Sugiyama ............ H04N 9/3164 |
| | | 315/297 |
| 2012/0327374 A1 | 12/2012 | Kitano et al. |
| 2016/0223895 A1 | 8/2016 | Okuda et al. |
| 2017/0097560 A1 | 4/2017 | Matsubara et al. |

FOREIGN PATENT DOCUMENTS

| | | |
|---|---|---|
| JP | 2012-212129 A | 11/2012 |
| JP | 2014-59513 A | 4/2014 |

\* cited by examiner

LIGHT SOURCE UNIT AND PROJECTOR

CROSS-REFERENCE TO RELATED APPLICATIONS

This application is a continuation of prior U.S. application Ser. No. 17/010,437, filed on Sep. 2, 2020, which claims the benefit of priority from the prior Japanese Patent Application No. 2019-160037 filed on Sep. 3, 2019 and Japanese Patent Application No. 2019-230553 filed on Dec. 20, 2019, the entire disclosures of which, including the specifications, claims, drawings, and abstracts thereof, are incorporated herein by reference in their entireties.

BACKGROUND OF THE INVENTION

Field of the Invention

The present invention relates to a light source unit and a projector including the light source unit.

Description of the Related Art

In these days, projectors have generally been in use in which light emitted from a light source is collected onto a micromirror display device called a digital micromirror device (DMD) or a display device made up of a liquid crystal panel so as to display a color image on a screen.

For instance, Japanese Patent Laid-Open No. 2012-212129 (JP-A-2012-212129) discloses an image display device (a light source unit) including an excitation light source, an optical wheel on which luminescent material layers are formed, a dichroic mirror provided between the optical wheel and the excitation light source, and a quarter-wave plate, which is a polarized light transforming device provided between the optical wheel and the dichroic mirror to change a polarization direction of excited light.

In the light source unit disclosed in JP-A-2012-212129, excitation light is shone individually onto the luminescent material layers provided on the optical wheel and configured to emit light of different colors so as to emit light having a wavelength in the red wavelength range or simply light in the red wavelength range and light having a wavelength in the green wavelength range or simply light in the green wavelength range. However, the optical wheel is made up of a substrate, which is a rotated member, and a rotation processor, which rotates and performs a rotation control, and this may enlarge the size of the light source unit.

SUMMARY OF THE INVENTION

The present invention has been made in view of the situations described above, and an object of the present invention is to provide a light source unit whose size can be reduced by a simple configuration and a projector including the light source unit.

According to an aspect of the present invention, there is provided a light source unit including: a first light source configured to emit light in a first wavelength range; a second light source configured to emit light in a second wavelength range; a first dichroic mirror configured to reflect the light in the first wavelength range incident thereon at a first incident angle and transmit the light in the second wavelength range incident thereon at a second incident angle, which is different from the first incident angle; and a second dichroic mirror configured to reflect the light in the second wavelength range that has passed through the first dichroic mirror, wherein after having been reflected by the second dichroic mirror, the light in the second wavelength range is incident on the first dichroic mirror at the first incident angle to then be reflected by the first dichroic mirror.

According to another aspect of the present invention, there is provided a projection control including: the light source unit described above; a display device onto which light from the light source unit is shone to thereby form image light; a projection optical system configured to project the image light emitted from the display device onto a projection target body; and a projection control unit configured to control the display device and the light source unit.

DETAILED DESCRIPTION OF THE PREFERRED EMBODIMENTS

First Embodiment

Figure 1:
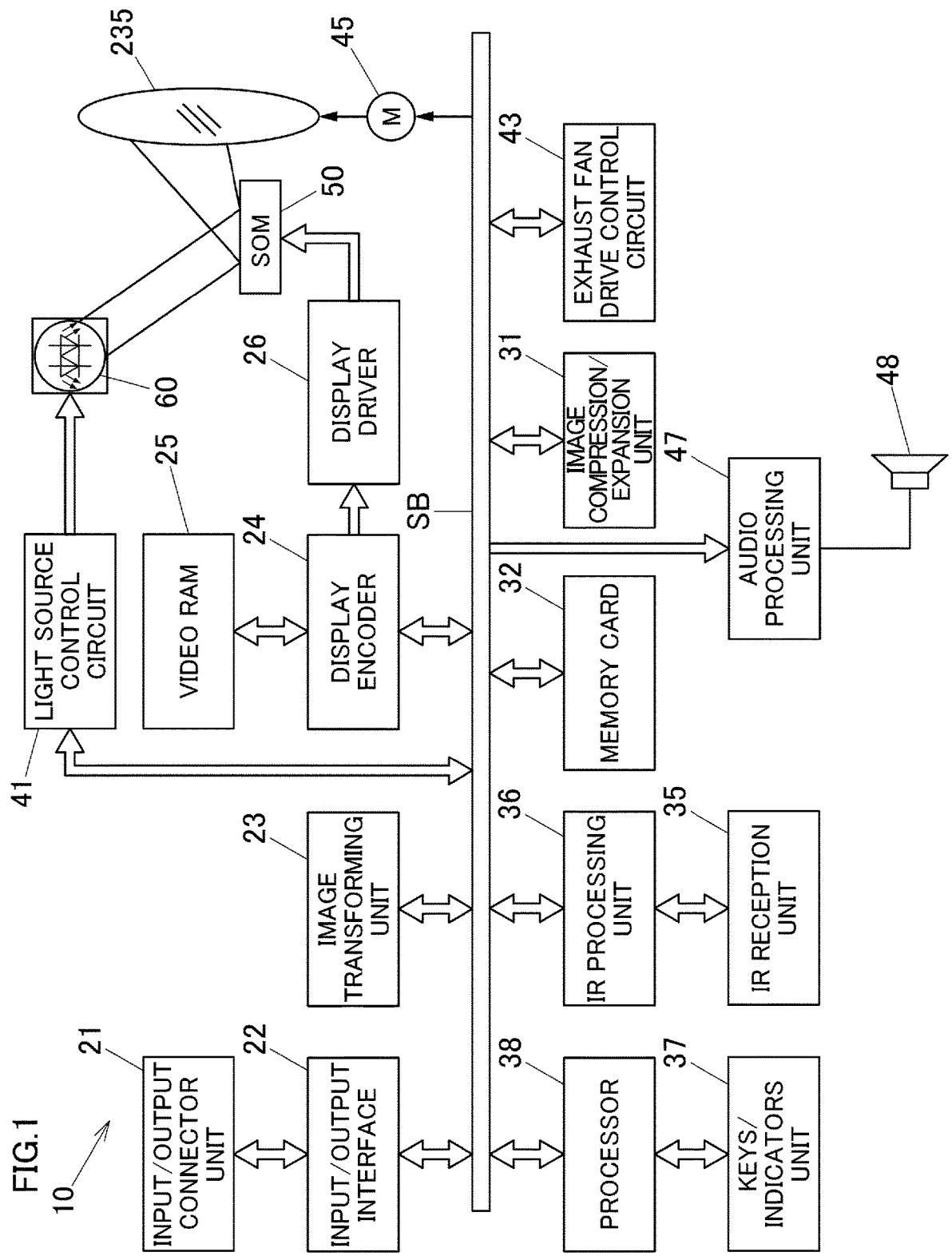
FIG. 1 is a diagram showing functional circuitry blocks of a projector according to a first embodiment of the present invention.

Hereinafter, a first embodiment of the present invention will be described. FIG. 1 is a diagram showing functional circuitry blocks of a projector 10. A projector control unit is made up of CPU including a processor 38 (a control unit) and an image transforming unit 23, a front-end control unit including an input/output interface 22, and a formatter unit including a display encoder 24 and a display driver 26. Image signals of various standards which are inputted from the input/output connector unit 21 are sent to the image transforming unit 23 via the input/output interface 22 and a system bus (SB), and the image signals so sent are transformed to be unified into an image signal of a predetermined format which is suitable for display in the image transforming unit 23. Thereafter, the unified image signal is outputted to the display encoder 24.

The display encoder 24 deploys the image signal inputted thereinto on a video RAM 25 for storage in it and generates a video signal from the contents stored in the video RAM 25, outputting the video signal so generated to the display driver 26.

The display driver 26 drives a display device 50, which is a spatial optical modulator (SOM), at an appropriate frame rate in response to the image signal outputted from the display encoder 24. Then, in the projector 10, a pencil of light emitted from a light source unit 60 is shined onto the display device 50 via a light guiding optical system, whereby image light is formed by reflected light from the display device 50, and an image is projected onto a projection target body such as a screen, not shown, via a projection optical system 220 for display on the screen. A movable lens group 235 of the projection optical system 220 can be driven by a lens motor 45 for zooming and focusing.

An image compression/expansion unit 31 performs a recording process in which a luminance signal and a color difference signal of an image signal are data compressed through processing of Adaptive Discrete Cosine Transform (ADCT) and Huffman coding, and the compressed data is sequentially written on a memory card 32, which constitutes a detachable recording medium. Further, with the projector 10 set in a reproducing mode, the image compression/expansion unit 31 reads out the image data recorded in the memory card 32 and expands the individual image data that makes up a series of dynamic images frame by frame. Then, the image compression/expansion unit 31 outputs the image data to the display encoder 24 by way of the image transforming module 23 and displays dynamic images based on the image data stored in the memory card 32.

The processor 38 governs the control of operations of individual circuitries inside the projector 10 and includes CPU, ROM that stores fixedly operation programs such as various settings, RAM that is used as a work memory, and the like.

Operation signals of a keys/indicators unit 37, which is made up of keys and indicators that are provided on an upper panel of a casing of the projector 10, are sent out directly to the processor 38. Key operation signals from a remote controller are received by an IR reception unit 35 and are then demodulated into a code signal at an Ir processing unit 36 for output to the processor 38.

The processor 38 is connected with an audio processing unit 47 by way of the system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

Additionally, the processor 38 controls a light source control circuit 41, which is a light source control unit. The light source control circuit 41 can control the operation of the light source unit 60, which includes a light source module 700 (a first light source 710 and a second light source 720), which will be described later, and a red light source device 380 (a third light source 310), so that light in predetermined wavelength ranges required in generating an image is emitted from the light source unit 60, the operation of the light source unit 60 being, for example, such that the light source unit 60 is caused to emit arbitrary light (light generated by adding and mixing three colors of light emitted from the second light source 720, a luminescent body 110, which will be described later, and the third light source 310 through additive color mixing) by switching on and off, for example, the first light source 710, the second light source 720, and the third light source 310 in a time-dividing fashion.

Further, the processor 38 causes an exhaust fan drive control circuit 43 to detect temperatures using a plurality of temperature sensors which are provided in the light source unit 60 and the like so as to control revolution speeds of exhaust fans based on the results of the temperature detections. In addition, the processor 38 also causes the exhaust fan drive control circuit 43 to keep the exhaust fans revolving by use of a timer or the like even after a power supply to a main body of the projector 10 is switched off. Alternatively, the processor 38 causes the exhaust fan drive control circuit 43 to switch off the power supply to the main body of the projector 10 depending upon the results of the temperature detections by the temperature sensors.

Figure 2:
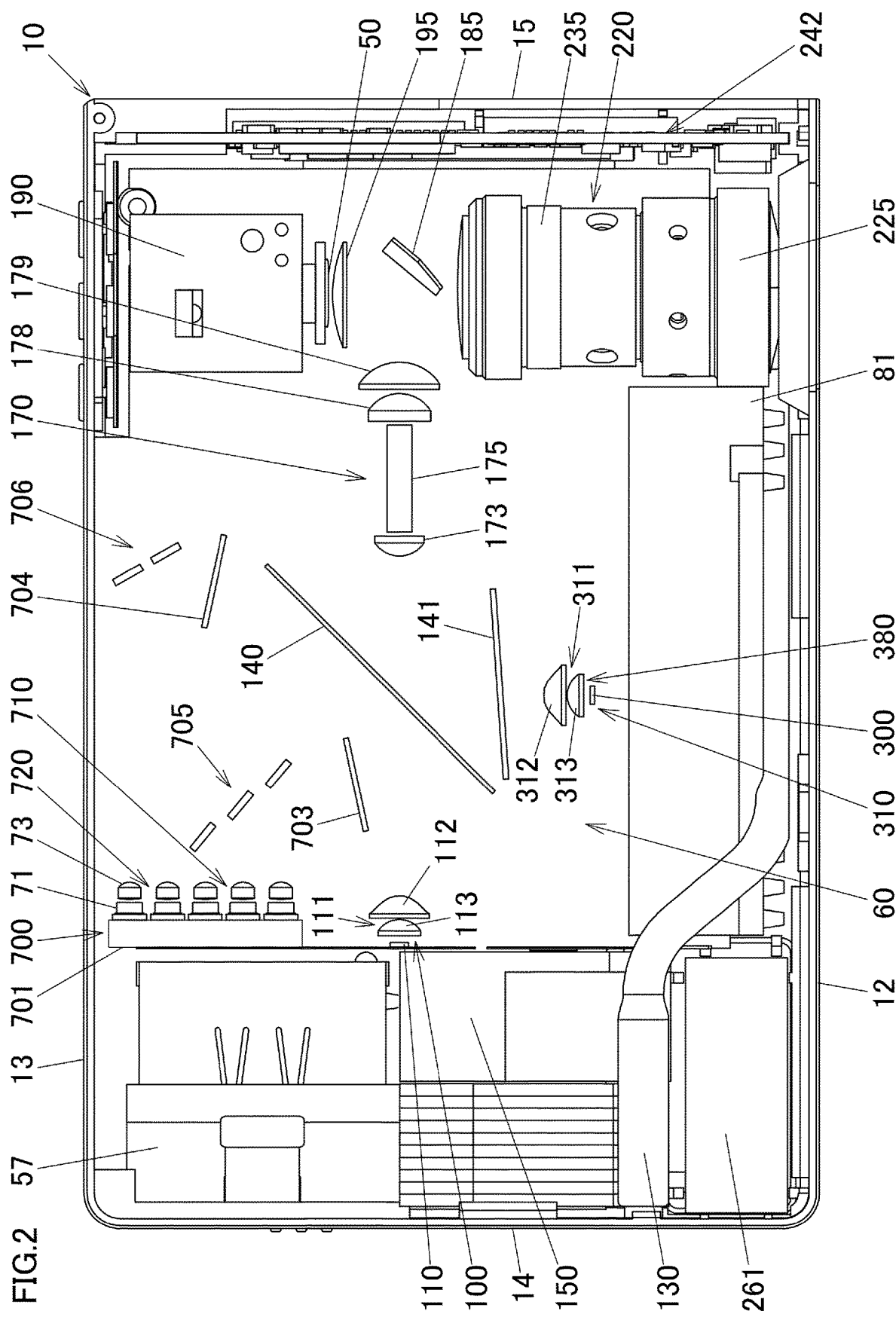
FIG. 2 is a schematic plan view showing an internal structure of the projector according to the first embodiment of the present invention.

Next, an internal structure of the projector 10 will be described. FIG. 2 is a schematic plan view showing the internal structure of the projector 10. Here, the casing of the projector 10 has a box-like configuration and includes a front panel 12, a rear panel 13, a right panel 14, and a left panel 15. In the following description, when left and right are referred to in relation to the projector 10, they denote a left direction and a right direction, respectively, with respect to a projecting direction, and when front and rear are referred to in relation to the projector 10, they denote a front direction and a rear direction, respectively, with respect to a direction towards a screen and a traveling direction of a pencil of light.

The projector includes a control circuit board 242 near the left panel 15. This control circuit board 242 includes a power supply circuit block, a light source control block, and the like. The projector 10 includes the light source unit 60 substantially at a central portion of the casing of the projector 10. Additionally, the projector 10 includes a light source-side optical system 170 and a projection optical system 220, which are disposed between the light source unit 60 and the left panel 15.

The light source unit 60 includes the first light source 710, which is a light source for light in a first wavelength range, the second light source 720, which is a light source for light in a second wavelength range, the third light source 310, which is a light source for light in a fourth wavelength range, the luminescent body 110 configured to emit light in a third wavelength range using light in the first wavelength range as excitation light, a first dichroic mirror 140, a second dichroic mirror 141, a first reflection mirror 705, and a second reflection mirror 706. A power supply connector 57 and a heat sink 150 are disposed sequentially in that order as seen from the side of the rear panel 13 between the light source unit 60 and the right panel 14. Additionally, the light source unit 60 includes a heat pipe 130 configured to conduct heat generated at the red light source device 380 (the third light source 310) to the heat sink 150 and a cooling fan 261 configured to cool the heat sink 150. The red light source device 380 (the third light source 310) is also cooled by a heat sink 81, in addition to the cooling fan 261, the heat pipe 130, and the heat sink 150, which are described above.

The light source module 700, which is a light source module, is disposed closer to the rear panel 13 and nearer to the right panel 14 in the projector 10. In this embodiment, light in the first wavelength range and light in the second wavelength range that the first light source 710 and the second light source 720 emit, respectively, are light having wavelength in the blue wavelength range or simply light in the blue wavelength range. The first light source 710 and the second light source 720 each include a plurality of blue laser diodes 71, which are semiconductor light emitting devices. The pluralities of blue laser diodes of the first light source 710 and the second light source 720 are held by a common holding member 701. Collimator lenses 73 are disposed individually on optical axes of the blue laser diodes 71, the collimator lenses 73 being each configured to transform light emitted from the blue laser diode 71 into parallel light so as to increase the directivity of light emitted from the blue laser diode 71.

In this embodiment, since the first light source 710 and the second light source 720 use the same blue laser diodes 71, a wavelength range of light in the first wavelength range and a wavelength range of light in the second wavelength range are the same. However, the first light source 710 and the second light source 720 may be made up of blue laser diodes of different wavelengths so that the wavelength range of light in the first wavelength range and the wavelength range of light in the second wavelength range differ from each other. Then, as an example in which the first light source 710 and the second light source 720 are made up of light emitting devices configured to emit first light and second light which are in different wavelength ranges, the second light source 720 may be made up of blue laser diodes, while the first light source 710 may be made up of light emitting devices such as laser diodes configured to emit ultraviolet light. In this case, as will be described by reference to FIG. 3 later, a cuton wavelength of p-polarized light can be disposed closer to a short-wave side than light in the ultraviolet wavelength range.

Although a front view is not available, the pluralities of blue laser diodes 71 of the first light source 710 and the second light source 720 are disposed into a matrix configuration of two rows and five columns by the holding member 701. The blue laser diodes 71 making up the first light source 710 and the second light source 720 do not have to be limited to plural numbers, and hence, the first light source 710 and the second light source 720 may each be made up of a single blue laser diode 71. In other words, the first light source 710 and the second light source 720 are each made up of one or a plurality of blue laser diodes 710. In the light source module 700 of this embodiment, three rows of blue laser diodes 71 (six blue laser diodes in total) which are disposed nearer to the front panel 12 make up the first light source 710, and two rows of blue laser diodes (four blue laser diodes in total) which are disposed farther away from the front panel 12 make up the second light source 720. The first light source 710 and the second light source 720 each emit light in a predetermined polarization direction. In this embodiment, the blue laser diodes 71 of the first light source 710 and the second light source 720 are all disposed to be aligned so that polarization directions thereof become the same, whereby all blue light emitted from the blue laser diodes 71 of the first light source 710 and the second light source 720 is caused to be incident on the first dichroic mirror 140 in the direction of p-polarized light by the first reflection mirror 705 and the second reflection mirror 706.

The first light source 710 includes one or a plurality of blue laser diodes 71 and a collimator lens or collimator lenses 73 which are disposed on an optical axis or optical axes of the blue laser diode or diodes 71. Additionally, the second light source 720 includes one or a plurality of blue laser diodes 71 and a collimator lens or collimator lenses 73 which are disposed on an optical axis or optical axes of the blue laser diode or diodes 71.

The first reflection mirror 705 and the second reflection mirror 706 are disposed on a light emerging side of the light source module 700 so that light from the light source module 700 is incident thereon. That is, the first reflection mirror 705 is disposed so that light in the first wavelength range emitted from the first light source 710 is incident thereon, and the second reflection mirror 706 is disposed so that light in the second wavelength range emitted from the second light source 720 is incident thereon. Additionally, the first reflection mirror 705 is inclined so that light in the first wavelength range emitted from the first light source 710 is incident on the first dichroic mirror 140 at a first incident angle $\theta 1$ or smaller, and the second reflection mirror 706 is inclined so that light in the second wavelength range emitted from the second light source 720 is incident on the first dichroic mirror 140 at a second incident angle $\theta 2$ or smaller. That is, in the first reflection mirror 705 on which a first reflection plane configured to reflect light in the first wavelength range is formed and in the second reflection mirror 706 on which a second reflection plane configured to reflect light in the second wavelength range is formed, the first reflection plane and the second reflection plane are made to be non-parallel to each other.

In this embodiment, the same rows of first reflection mirrors 705 and second reflection mirrors 706 as those of the blue laser diodes 71 making up the first light source 710 and the second light source 720 are provided (in this embodiment, since three rows of first light sources 710 and two rows of second light sources 720 are provided, three first reflection mirrors 705 and two second reflection mirrors 706 are provided). In addition, the same numbers of first reflection mirrors 705 and second reflection mirrors 706 as those of blue laser diodes 71 may be provided. In the case that pluralities of first reflection mirrors 705 and second reflection mirrors 706 are provided, the first reflection mirrors 705 and the second reflection mirrors 706 are disposed in a step-like fashion, whereby an overall width of a pencil of light reflected by the first reflection mirrors 705 and the second reflection mirrors can be reduced. The numbers of first reflection mirrors 705 and second reflection mirrors 706 are not limited to the same numbers as those of blue laser diodes 71 making up the first light source 710 and the second light source 702. For example, even though the blue laser diodes 71 making up the first light source 710 are provided in three rows, a single first reflection mirror 705 may be provided therefor, provided that the single first reflection mirror 705 is sized large enough to reflect all light emitted from the three rows of blue laser diodes 71. Similarly, the second reflection mirror 706 may be made up of a single reflection mirror which is large enough to reflect all light from the plurality of blue laser diodes 71 of the second reflection mirror 706.

In the light source unit 60 of this embodiment, a diffuse plate 703 is disposed between the first reflection mirror 705 and the first dichroic mirror 140, and a diffuse plate 704 is disposed between the second reflection mirror 706 and the first dichroic mirror 140. The diffuse plate 703 and the diffuse plate 704 transmit light to thereby diffuse and shape properly the light. The diffuse plate 703 uniforms an intensity distribution of light in the first wavelength range which is shone onto the luminescent body 110 to thereby improve the luminous efficiency and the service life of the luminescent body 110. The diffuse plate 704 uniforms an intensity distribution of light in the second wavelength range to thereby reduce the speckle nose of an image projected onto a projection target body.

The red light source device 380 includes the third light source 310 and a collective lens group 311 (a collective lens 312 and a collective lens 313) configured to collect light emitted from the third light source 310. The third light source 310 is made up of a red light emitting diode 300. The red light emitting diode 300 is a semiconductor light emitting device for emitting light in a fourth wavelength range, which is light having a wavelength in the red wavelength range or simply light in the red wavelength range. Although the number of red light emitting diodes 300 making up the third light source 310 is illustrated as being one (similar also in FIGS. 4 and 5), a plurality of red light emitting diodes 300 may be provided.

A green light source device 100 includes the luminescent body 110 and a collective lens group 111 (a collective lens 112 and a collective lens 113) configured to collect reflected light from the first dichroic mirror 140 and light emitted from the luminescent body 110. The luminescent body 110 is a green luminescent material body configured to emit luminescent light (light in the third wavelength range) using light in the first wavelength range as excitation light. In this embodiment, the luminescent body 110 is a fixed luminescent plate having a mirror finished flat plane; however, the luminescent body 110 may take the form of a rotatably driven luminescent wheel on which a green luminescent material body is formed in a circumferential direction. However, in the event that the luminescent body 110 takes the form of such a luminescent wheel, not only is the luminescent body 110 enlarged in size, but also electric power is consumed to rotate the luminescent wheel. Due to this, the light source unit 60 can be reduced in size and made to consume less electric power by configuring the luminescent body 110 as the fixed luminescent plate.

Figure 3:
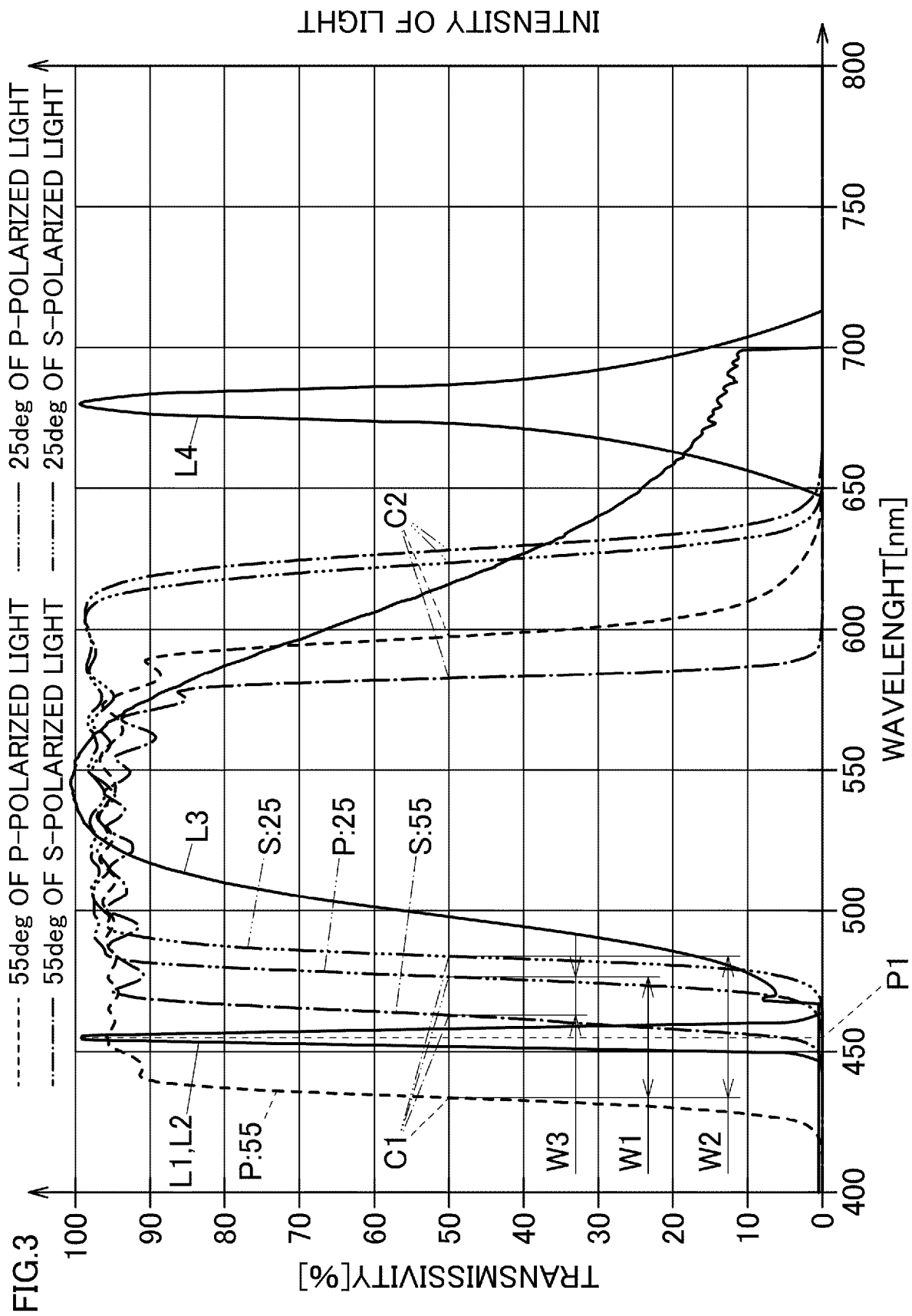
FIG. 3 is a diagram showing a transmission characteristic and light wavelength range distributions of a first dichroic mirror according to the first embodiment of the present invention.

The first dichroic mirror 140 is a mirror configured to transmit incident light in a predetermined wavelength range and reflect light in other wavelength ranges differing from the predetermined wavelength range. The first dichroic mirror 140 has an incident angle dependent characteristic in which the first dichroic mirror 140 transmits or reflects light depending upon an incident angle at which light is incident on the first dichroic mirror 140. The incident angle dependent characteristic of the first dichroic mirror 140 will be described by reference to FIG. 3. FIG. 3 is a diagram showing a transmission characteristic of the first dichroic mirror 140 when light, which is p-polarized light and s-polarized light in terms of polarization direction, is incident thereon at different incident angles and a wavelength range distribution of light incident on the first dichroic mirror 140. An axis of abscissa at a bottom side of FIG. 3 denotes wavelength, and an axis of ordinate at a left side of FIG. 3 denotes transmissivity. Additionally, an axis of ordinate at a right side of FIG. 3 denotes intensities of light in the first wavelength range L1, light in the second wavelength range L2, light in the third wavelength range L3, and light in the fourth wavelength range L4, which are shown in FIG. 3. Broken line, alternate long and short dash line, chain double-dashed line, and chain triple-dashed line denote, respectively, transmission characteristics of the first dichroic mirror 140 when p-polarized light is incident at 55 degrees, s-polarized light is incident at 55 degrees, p-polarized light is incident at 25 degrees, and s-polarized light is incident at 25 degrees.

Here, a description will be made based on the understanding that transmission denotes a case where the transmissivity is 50% or larger, while reflection denotes a case where the transmissivity is less than 50%. A general dichroic mirror including the first dichroic mirror 140 is characterized by being dependent on polarization direction and incident angle, and according to the polarization direction and incident angle dependent characteristic of the general dichroic mirror, a wavelength at which light is transmitted or reflected (a cuton wavelength C1 which is a wavelength reaching a transmissivity of 50% and a cutoff wavelength C2 which is a wavelength falling below 50%) differs depending upon a polarization angle (p-polarized light or s-polarized light) and an incident angle.

As for the polarization direction dependent characteristic, even in the case that light incident as s-polarized light and light incident as p-polarized light are incident on the first dichroic mirror 140 at the same incident angle, wavelength components of p-polarized light which are transmitted through the first dichroic mirror 140 spread over a wider wavelength range than wavelength components of s-polarized light. A cuton wavelength C1 of p-polarized light is situated closer to a short wavelength side than a cuton wavelength range C1 of s-polarized light, and a cutoff wavelength C2 of p-polarized light is situated closer to a long wavelength side than a cutoff wavelength C2 of s-polarized light.

As for the incident angle dependent characteristic, in the first dichroic mirror 140, as an incident angle of incident light becomes larger, the cuton wavelength C1 and the cutoff wavelength C2 shift more towards the short wavelength side, and this is true of either of p-polarized light and s-polarized light. The incident angle dependency of the first dichroic mirror 140 differs between p-polarized light and s-polarized light, and when the incident angle of incident light is increased, the cuton wavelength C1 varies more in p-polarized light than in s-polarized light. On the other hand, when the incident angle of incident light is increased, the cutoff wavelength C2 varies more in s-polarized light than in p-polarized light.

The cuton wavelength C1 and the cutoff wavelength C2 of the first dichroic mirror 140 and the incident angle dependent characteristic and the polarization direction dependent characteristic (the extent to which the cuton wavelength C1 and the cutoff wavelength C2 vary) of the first dichroic mirror 140 can be changed by designing them accordingly.

FIG. 3 shows light transmission characteristics of the first dichroic mirror 140 when p-polarized light and s-polarized light are incident on the first dichroic mirror 140 at a relatively small incident angle of 25 degrees and at a relatively large incident angle of 55 degrees. For example, when light, which is p-polarized light, is incident on the first dichroic mirror 140 at the incident angle of 25 degrees, as shown by the chain double-dashed line, the cuton wavelength C1 is of the order of 475 nm, and the cutoff wavelength C2 is of the order of 625 nm. When light, which is p-polarized light, is incident on the first dichroic mirror 140 at the incident angle of 55 degrees, as shown by the broken line, the cuton wavelength C1 is of the order of 435 nm, and the cutoff wavelength C2 is of the order of 595 nm. For example, when incident light having a wavelength of 455 nm is incident on the first dichroic mirror 140 at the incident angle of 25 degrees, the first dichroic mirror 140 can reflect the incident light, whereas when the incident light is incident on the first dichroic mirror 140 at the incident angle of 55 degrees, the first dichroic mirror 140 can transmit the incident light. In addition, assuming that an incident angle at which light is reflected when the light is incident on the first dichroic mirror 140 is a first incident angle θ1 and an incident angle at which light is transmitted when the light is incident on the first dichroic mirror 140 is a second incident angle θ2, the second incident angle θ2 constitutes an angle larger than the first incident angle θ1.

Here, the first dichroic mirror 140 reflects light in the first wavelength range L1 and light in the second wavelength range L2 when they are incident thereon at the first incident angle θ1, while the first dichroic mirror transmits light in the first wavelength range L1 and light in the second wavelength range L2 when they are incident thereon at the second incident angle θ2. For example, in the case of light which is p-polarized light, assuming that the first incident angle θ1 is 25 degrees and the second incident angle θ2 is 55 degrees, the wavelengths of light in the first wavelength range L1 and light in the second wavelength range L2 only need to fall within a separable wavelength range W1 ranging from 435 nm to 475 nm. In this case, the first dichroic mirror 140 reflects and transmits light in the first wavelength range L1 and light in the second wavelength range L2, respectively, based on their incident angles to thereby separate optical paths of the light in the first wavelength range L1 and the light in the second wavelength range L2.

As described above, in the first dichroic mirror 140, as the incident angle of incident light becomes larger, the cuton wavelength C1 and the cutoff wavelength C2 shift closer to the short wavelength side, while as the incident angle of incident light becomes smaller, the cuton wavelength C1 and the cutoff wavelength C2 shift closer to the long wavelength side. Consequently, the width of the separable wavelength range W1 can be expanded by either decreasing the first incident angle θ1 or increasing the second incident angle θ2, whereby a selection range of wavelengths for light in the first wavelength range L1 and light in the second wavelength range L2 (for example, a range over which peak wavelengths P1 of light in the first wavelength range L1 and light in the second wavelength range L2 can be picked up or sizes of full widths at half maximums (FWHM) of light in the first wavelength range L1 and light in the second wavelength range L2) can be expanded.

Here, since a main component of light in the third wavelength range L3 is a wavelength range from 500 nm to 570 nm, light in the third wavelength range L3 is substantially transmitted through the first dichroic mirror 140 irrespective of its incident angle. Then, since a main component of light in the fourth wavelength range L4 is a wavelength range from 650 nm to 710 nm, light in the fourth wavelength range L4 is substantially reflected by the first dichroic mirror 140 irrespective of its incident angle. Consequently, the first dichroic mirror 140 has a transmission characteristic in which the first dichroic mirror 140 transmits light in the third wavelength range L3 and reflects light in the fourth wavelength range L4. Further, since the first dichroic mirror 140 substantially transmits and substantially reflects light in the third wavelength range L3 and light in the fourth wavelength range L4, respectively, irrespective of their incident angles, the extent (degree of freedom) to which the luminescent body 110 configured to emit light in the third wavelength range L3 and the third light source 310 configured to emit light in the fourth wavelength range L4 are laid out is expanded, which contributes to realizing the miniaturization of the light source unit 60 and the projector 10.

Returning to FIG. 2, the second dichroic mirror 141 is a mirror configured to transmit or reflect light incident thereon. The second dichroic mirror 141 has a transmission characteristic in which the second dichroic mirror 141 reflects light in the second wavelength range emitted from the second light source 720 and transmits light in the fourth wavelength range emitted from the third light source 310. Similar to the first dichroic mirror 140, the second dichroic mirror 141 has an incident angle dependent characteristic in which the second dichroic mirror 141 transmits or reflects light incident thereon based on its incident angle.

In general, a dichroic mirror is made up by applying a reflection coat, which is configured to reflect light having a specific wavelength, to a transparent base material or substrate such as glass. In this embodiment, a reflection coat, which is configured to reflect light in the second wavelength range irrespective of its incident angle, is applied to the second dichroic mirror 141. In addition, in the case that a location onto which light in the second wavelength range emitted from the second light source 720 is shone and a location onto which light in the fourth wavelength range emitted from the third light source 310 is shone are clearly divided on the second dichroic mirror 141, the reflection treatment to reflect light in the second wavelength range described above may be applied only to a location covering the location onto which light in the second wavelength range is shone. For example, in the case that the optical path of light in the second wavelength range is situated on a longitudinally right-hand part of the second dichroic mirror 141 shown in FIG. 2 and the optical path of light in the fourth wavelength range is situated on a longitudinally left-hand part of the second dichroic mirror 141, the second dichroic mirror 141 can be prepared by applying a reflection coating to reflect light in the second wavelength range to a portion of the second dichroic mirror 141 which extends from a longitudinal right end to a center thereof.

The light source-side optical system 170 includes a collective lens 173, a light guiding device 175 such as a light tunnel or a glass rod, collective lenses 178, 179, a shining mirror 185, and a condenser lens 195. The condenser lens 195 emits image light emitted from the display device 50, which is disposed on a side of the condenser lens 195 which faces the rear panel 13, towards the projection optical system 220, and hence, the condenser lens 195 also constitutes a part of the projection optical system 220.

The collective lens 173 is disposed near an entrance port of the light guiding device 175 to collect light source light from the light source unit 60. Lights in the red, green, and blue wavelength ranges are collected by the collective lens 173 to enter the light guiding device 175, where luminance distributions thereof are uniformed. A pencil of light emitted from an emerging port of the light guiding device 175 is collected at the collective lenses 178, 179 and is then guided towards the shining mirror 185.

The shining mirror 185 reflects the pencil of light collected at the collective lenses 178, 179 to be shone onto the display device 50 at a predetermined angle by way of the condenser lens 195. A heat sink 190 is provided on a side of the display device 50, which is a digital micromirror device (DMD), which faces the rear panel 13, so that the display device 50 is cooled by the heat sink 190.

The pencil of light, which is the light source light shone onto an image forming plane of the display device 50 by the light source-side optical system 170, is reflected on the imaging forming plane of the display device 50 and is then projected onto a screen by way of the projection optical system 220 as projected light. Here, the projection optical system 220 is made up of the condenser lens 195, the movable lens group 235, a fixed lens group 225, and the like. The movable lens group 235 is configured to move by the lens motor or manually. The movable lens group 235 and the fixed lens group 225 are incorporated in a fixed lens barrel. Thus, the fixed lens barrel incorporating therein the movable lens group 235 is made as a variable-focus lens for zooming and focusing.

By configuring the projector 10 in the way described heretofore, when light is emitted from the light source unit 60 at a required timing, lights in the blue, green, and red wavelength ranges are incident on the display device 50 by way of the light source-side optical system 170. As a result, DMD, which is the display device 50 of the projector 10, displays individually lights in the blue, green, and red wavelength ranges in a time-sharing fashion according to data, whereby a color image can be projected onto the screen.

Figure 4:
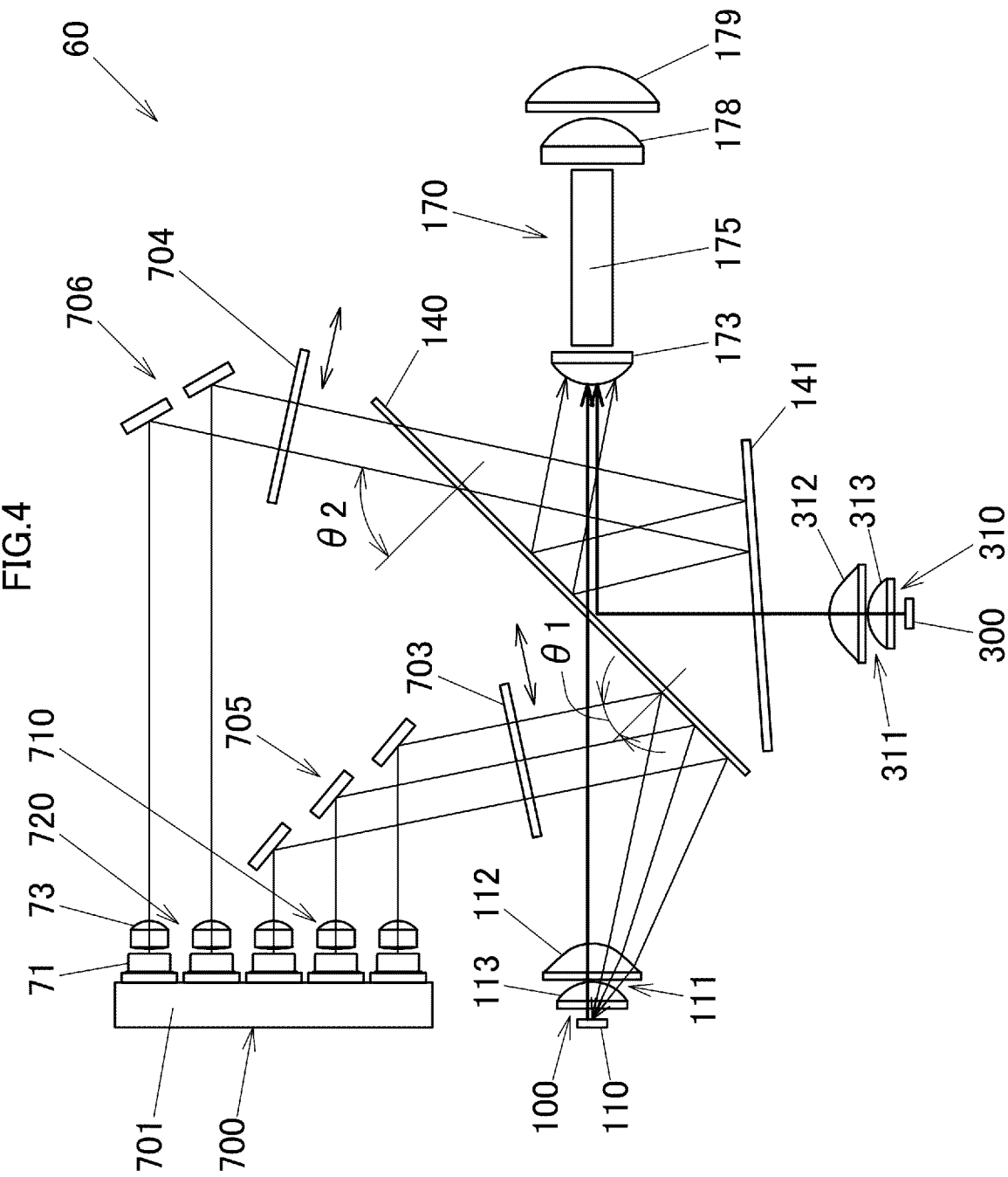
FIG. 4 is a schematic plan view of a part of a light source unit according to the first embodiment of the present invention.

Next, optical paths in the light source unit 60 will be described. FIG. 4 shows partially optical paths of light in the first wavelength range to light in the fourth wavelength range. Light in the first wavelength range emitted from the first light source 710 is reflected towards the first dichroic mirror 140 by the first reflection mirrors 705. Additionally, the light in the first wavelength range reflected by the first reflection mirrors 705 is diffused at a diffuse angle set in advance by the diffuse plate 703 and is then incident on the first dichroic mirror 140 at the first incident angle θ1 as p-polarized light. The first incident angle θ1 in FIG. 4 can be set, for example, at 25 degrees. Since light in the first wavelength range incident on the first dichroic mirror 140 at the first incident angle θ1 is situated closer to the short wavelength side than the cuton wavelength C1 as shown in FIG. 3, the light in the first wavelength range so incident is reflected towards the luminescent body 110. The light in the first wavelength range emitted from the first light source 710 and reflected by the first dichroic mirror 140 is collected by the collective lens group 111 and is then shone onto the luminescent body 110.

The luminescent body 110 is excited by the first dichroic mirror 140 and then emits light in the third wavelength range (light in the green wavelength range), which is luminescent light, in every direction. The light in the third wavelength range emitted from the luminescent body 110 is collected by the collective lens group 111 and is then guided to the first dichroic mirror 140. Since the first dichroic mirror 140 substantially transmits light in the third wavelength range, as shown in FIG. 3, almost all the light in the third wavelength range which is incident on the first dichroic mirror 140 is incident on the collective lens 173 of the light source-side optical system 170.

Light in the second wavelength range emitted from the second light source 720 is reflected towards the first dichroic mirror 140 by the second reflection mirrors 706. In addition, the light in the second wavelength range reflected by the second reflection mirrors 706 is diffused at a diffuse angle set in advance by the diffuse plate 704 and is then incident on the first dichroic mirror 140 at the second incident angle θ2 as p-polarized light. The second incident angle θ2 in FIG. 4 can be set, for example, at 55 degrees. Since the light in the second wavelength range incident on the first dichroic mirror 140 at the second incident angle θ2 is situated closer to the long wavelength side than the cuton wavelength C1 as shown in FIG. 3, the light in the second wavelength range so incident on the first dichroic mirror 140 is transmitted therethrough. The light in the second wavelength range emitted from the second light source 720 and transmitted through the first dichroic mirror 140 is reflected by the second dichroic mirror 141 and is then incident on the first dichroic mirror 140 at the first incident angle θ1 as p-polarized light. The first incident angle θ1 of the light in the second wavelength range is set at an angle which is the same as or different from the first incident angle θ1 of the light in the first wavelength range. Since the light in the second wavelength range incident on the first dichroic mirror 140 at the first incident angle θ1 (for example, 25 degrees) from the second dichroic mirror 141 is situated closer to the short wavelength side than the cut on wavelength C1, as shown in FIG. 3, the light in the second wavelength range is then reflected towards the collective lens 173 of the light source-side optical system 170. Consequently, the light in the second wavelength range reflected by the first dichroic mirror 140 is incident on the collective lens 173 of the light source-side optical system 170.

Light in the fourth wavelength range emitted from the third light source 310 is collected by the collective lens group 311 and is then guided to the second dichroic mirror 141. As described before, the second dichroic mirror 141 transmits light in the fourth wavelength range. Consequently, the light in the fourth wavelength range which is incident on the second dichroic mirror 141 passes through the second dichroic mirror 141 and is then incident on the first dichroic mirror 140. Since the first dichroic mirror 140 has the characteristic in which the first dichroic mirror 140 reflects light in the fourth wavelength range, the light in the fourth wavelength range which is incident on the first dichroic mirror 140 is reflected towards the collective lens 173 of the light source-side optical system 170. Consequently, the light in the fourth wavelength range reflected by the first dichroic mirror 140 is incident on the collective lens 173 of the light source-side optical system 170.

As described above, the light in the second wavelength range to the light in the fourth wavelength range (light in the blue wavelength range, light in the green wavelength range, light in the red wavelength range) which are collected onto the collective lens 173 are combined together onto the same optical path as the light source light of the light source unit 60 and are then emitted towards the projection optical system 220 by way of the light source-side optical system 170.

Second Embodiment

Figure 5:
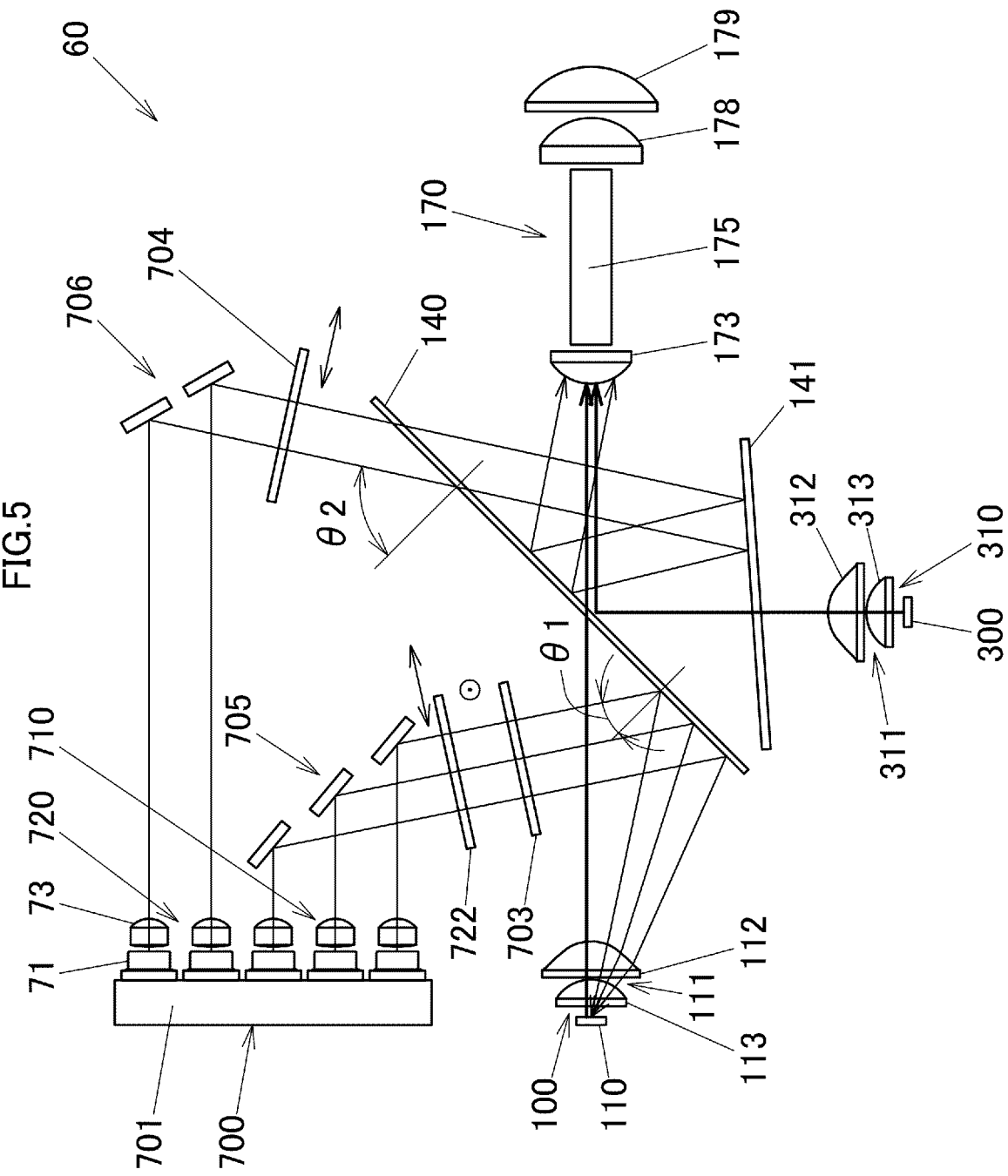
FIG. 5 is a schematic plan view of a part of a light source unit according to a second embodiment of the present invention.

Next, a second embodiment of the present invention will be described. In description of this second embodiment, like reference signs will be given to like configurations to those of the first embodiment, and descriptions of the like configurations will be omitted or simplified. As shown in FIG. 5, in this second embodiment, a half-wave plate 722 is disposed between first reflection mirrors 705 and a diffuse plate 703, which are both on an optical path of light in a first wavelength range. The half-wave plate 722 acts to turn a polarization direction through 90 degrees, whereby the half-wave plate 722 can transform light in the first wavelength range which is emitted as p-polarized light into s-polarized light. Consequently, light in the first wavelength range, which is now transformed into s-polarized light, and light in a second wavelength range, which remains as p-polarized light, are incident on a first dichroic mirror 140.

For example, light in the first wavelength range, which is s-polarized light, is incident on the first dichroic mirror 140 at 25 degrees, and light in the second wavelength range, which is p-polarized light, is incident on the first dichroic mirror 140 at 55 degrees. Here, when referring to FIG. 3, the cuton wavelength C1 of the s-polarized light, which is incident on the first dichroic mirror 140 at 25 degrees, is higher than the cuton wavelength C1 of the p-polarized light, which is similarly incident on the first dichroic mirror 140 at 25 degrees. Consequently, a width of a separable wavelength range W2 of the light in the first wavelength range L1 and the light in the second wavelength range L2 becomes wider than the separable wavelength range W1. That is, the selection range of wavelengths for the light in the first wavelength range L1 and the light in the second wavelength range L2 (for example, a range over which peak wavelengths P1 of the light in the first wavelength range L1 and the light in the second wavelength range L2 can be picked up or sizes of FWHM of light in the first wavelength range L1 and light in the second wavelength range L2) expands more in this second embodiment than in the first embodiment.

In addition, the half-wave plate 722 may be disposed between second reflection mirrors 706 and a diffuse plate 704, which are both on an optical path of light in the second wavelength range. In the case of the half-wave plate 722 being disposed between the second reflection mirrors 706 and the diffuse plate 704, light in the first wavelength range, which is p-polarized light, and light in the second wavelength range, which is s-polarized light, are incident on the first dichroic mirror 140 at a first incident angle θ1 and a second incident angle θ2, respectively, and hence, when referring to FIG. 3, a separable wavelength range W3 becomes narrower than the separable wavelength range W1 and the separable wavelength range W2, whereby the selection range of wavelengths for the light in the first wavelength range and the light in the second wavelength range is narrowed. However, there is provided an advantage that the degree of freedom in configuring the layout of the light source unit 60 is increased. Even in the case of the half-wave plate 722 being disposed between the second reflection mirrors 706 and the diffuse plate 704, by disposing blue laser diodes 71 of a first light source 710 and a second light source 720 in such a manner that s-polarized light is emitted to the first dichroic mirror 140, the light in the first wavelength range L1 and the light in the second wavelength range L2 can be separated by the separable wavelength range W2.

FIRST MODIFIED EXAMPLE

Next, a first modified example of the present invention will be described. In this first modified example, a description of like configurations to those of the first embodiment and the second embodiment will be omitted or simplified. In this first modified example, a first dichroic mirror 140 can rotate around one point which constitutes a longitudinal center and a transverse center of the first dichroic mirror 140. The first dichroic mirror 140, which is rotatable, can adjust incident angles of light in a first wavelength range and light in a second wavelength range in a time-sharing fashion. As a result, a light source 60 can exclude the first reflection mirrors 705 and the second reflection mirrors 706 which act to cause the light in the first wavelength range and the light in the second wavelength range to be incident on the first dichroic mirror 140 at the first incident angle θ1 and the second incident angle θ2, respectively, in the first embodiment. Alternatively, even in the case that the first dichroic mirror 140 is fixed, by disposing a first light source 710 and a second light source 720 in such a manner that the first light source 710 and the second light source 720 are not parallel to each other, that is, by tilting the first light source 710 and the second light source 720 at such predetermined angles that the first light source 710 and the second light source 720 are not parallel to each other, light in the first wavelength range and light in the second wavelength range, which are incident on the first dichroic mirror 140, become non-parallel to each other, whereby the first reflection mirrors 705 and the second reflection mirrors 706 are made unnecessary. The position of the rotating point or shaft of the rotatable first dichroic mirror 140 is not limited to the central portion of the first dichroic mirror 140, and hence, the rotating shaft may be located in an arbitrary position (for example, a transversely central and longitudinally left end position). Further, a plurality of first dichroic mirrors 140 may be provided in such a manner as to rotate individually. This first modified example can be applied to both the first embodiment and the second embodiment described before.

SECOND MODIFIED EXAMPLE

Next, a second modified example of the present invention will be described. In this second modified example, a description of like configurations to those of the first embodiment, the second embodiment, and the first modified example will be omitted or simplified. In this second modified example, first reflection mirrors 705 and second reflection mirrors 706 are not necessarily fixed in predetermined positions at predetermined angles but are movable. The first reflection mirrors 705 and the second reflection mirrors 706 can act to move towards and away from a light source module 700 (a first light source 710 and a second light source 720) so as to change their positions. For example, in the case that the first reflection mirrors 705 are configured movable, by reducing a distance between the first reflection mirrors 705 and the first light source 710 (blue laser diodes 71), an optical path to a luminescent body 110 is shortened to thereby improve the convergence of light, whereby an advantage can be expected that the luminescent body 110 can be reduced in size, for example.

The moving actions of the first reflection mirrors 705 and the second reflection mirrors 706 may act to change their tilting angles so that light from the first light source 710 and the second light source 720 are incident on a first dichroic mirror 140 at a first incident angle θ1 and a second incident angle θ2, respectively. Changing the tilting angles of the first reflection mirrors 705 and the second reflection mirrors 706 increases the number of locations that can be adopted as locations where to dispose the first light source 710 and the second light source 720, as a result of which the number of layout configurations of the light source unit 60 is increased. In particular, in the case of the first reflection mirrors 705 being configured movable, a shining location of light in a first wavelength range which is incident on the luminescent body 110 can be changed, as a result of which a service life of the luminescent body 110 can be improved. This second modified example can be applied to both the first embodiment and the second embodiment and can also be used together with the first modified example.

In addition, the first reflection mirrors 705 and the second reflection mirrors 706 can act to change not only the tilting angles of the first reflection mirrors 705 and the second reflection mirrors 706 but also distances between the first reflection mirrors 705 and the second reflection mirrors 706 and the light source module 700 (the first light source 710 and the second light source 720). In FIGS. 4 and 5, the first dichroic mirror 140 is disposed in a position where all light of the blue laser diodes 71 is prevented from striking directly the first dichroic mirror 140, and at a timing when blue light is emitted, the first reflection mirrors 705 in FIGS. 4 and 5 are moved to positions where the first reflection mirrors 705 lie away from the blue laser diodes 71 as the second reflection mirrors 706 do, so that the second reflection mirrors 706 and the first reflection mirrors 705 so moved are disposed so as to be aligned along a substantially identical oblique plane made up of tilting planes of the first and second reflection mirrors 705, 706. This enables all the light of the blue laser diodes 71 to be incident on the first dichroic mirror 140 at the second incident angle θ2. By adopting this configuration, since all the light of the blue laser diodes 71 passes through the first dichroic mirror 140, all the light of the blue laser diodes 71 can be made use of as blue light.

Next, at a timing when green light is emitted, the second reflection mirrors 706 in FIGS. 4 and 5 are moved to lie nearer to the blue diodes 71 as the first reflection mirrors 705 do, so that the second reflection mirrors 706 so moved and the first reflection mirrors 705 are disposed so as to be aligned along a substantially identical oblique plane made up of the tilting planes of the first and second reflection mirrors 705, 706. This enables all the light of the blue laser diodes 71 to be incident on the first dichroic mirror 140 at the first incident angle θ1. By adopting this configuration, since all the light of the blue laser diodes 71 is reflected by the first dichroic mirror 140 so as to be incident on the luminescent body 110. Thus, all the light of the blue laser diodes 71 can be used to shine the luminescent body 110, whereby light source light can be made brighter.

In the first embodiment, the second embodiment, and the first and second modified examples, the mirror plane of the luminescent plate on which the luminescent body 110 is formed is described as being disposed in such a manner as to be directed towards the first dichroic mirror 140 and the light source-side optical system 170; however, the luminescent plate may be disposed in such a manner as to be inclined relative to an optical axis which connects the first dichroic mirror 140 and the light source-side optical system 170. As a result, even in the case that light in the first wavelength range is reflected on the mirror plane without exciting the luminescent body 110, the light in the first wavelength range can be prevented from being guided towards the light source-side optical system 170 to mix with light in a third wavelength range.

Third Embodiment

Figure 6A:
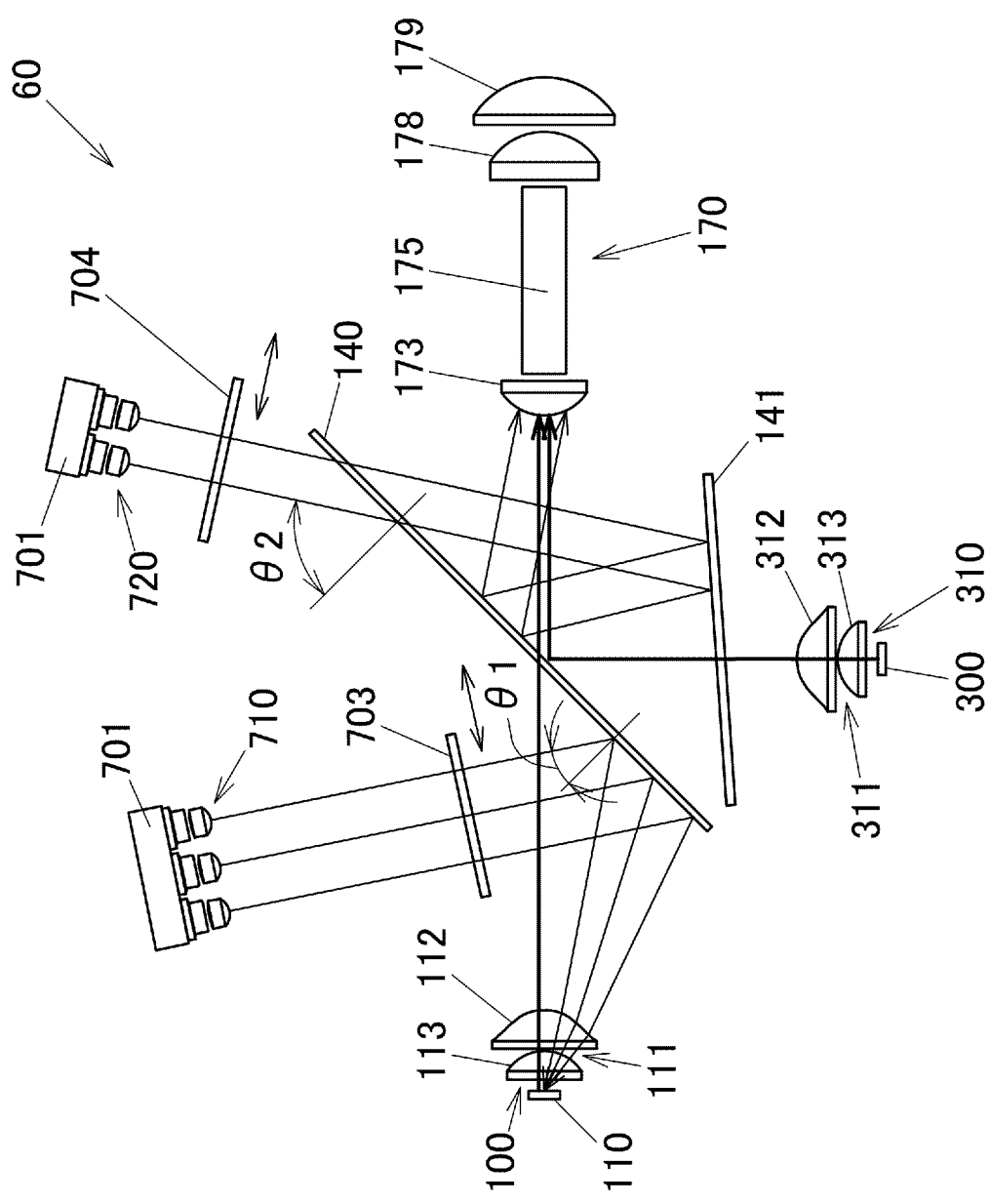
FIG. 6A is a schematic plan view of a part of a light source unit according to a third embodiment of the present invention.

Next, a third embodiment of the present invention will be described by use of FIG. 6A. FIG. 6A is a schematic plan view showing partially a light source unit according to the third embodiment of the present invention. In a description of the third embodiment, like configurations to those of the first embodiment and the second embodiment will be omitted or simplified.

In this third embodiment, separate holding members 701 are provided to hold separately a first light source 710 and a second light source 720. A holding member 701 onto which the first light source 710 is held and a holding member 701 onto which the second light source 720 is held are separated, and positions and directions in which the first light source 710 and the second light source 720 are disposed are changed from the positions and directions in which the first light source 710 and the second light source 720 are disposed in the first embodiment and the second embodiment. That is, the first reflection mirrors 705 and the second reflection mirrors 706, which are used in the first and second embodiments, are omitted herein, whereby light emitted from the first light source 710 and light emitted from the second light source 720 are made to be incident directly onto a first dichroic mirror 140 without involvement of the first reflection mirrors 705 and the second reflection mirrors 706.

The first light source 710 is disposed in such a position and at such a predetermined angle that light in a first wavelength range emitted from the first light source 710 is incident on the first dichroic mirror 140 at a first incident angle θ1 (for example, 25 degrees). The second light source 720 is disposed in such a position and at such a predetermined angle that light in a second wavelength range emitted from the second light source 720 is incident on the first dichroic mirror 140 at a second incident angle θ2 (for example, 55 degrees) which is larger than the first incident angle (for example, 25 degrees).

Figure 6B:
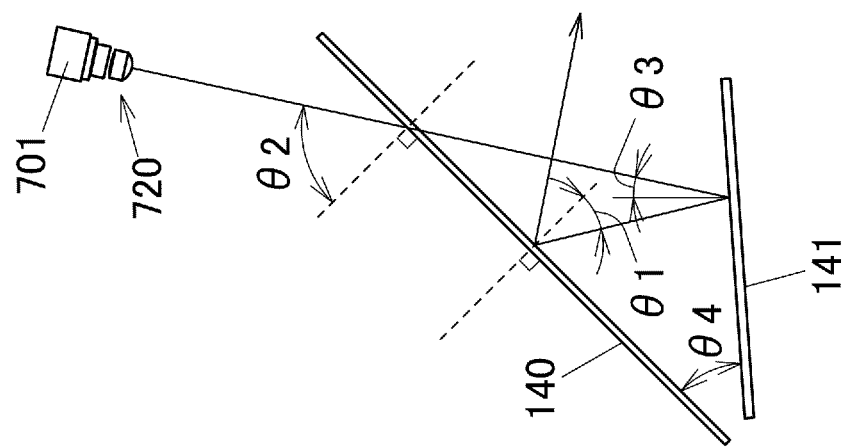
FIG. 6B is an enlarged view showing a central portion of FIG. 6A in an enlarged fashion.

FIG. 6B shows roughly a optical path of light in the second wavelength range emitted from the second light source 720 and reflected on the first dichroic mirror 140 and a second dichroic mirror 141, which are both shown in FIG. 6A. FIG. 6B is an enlarged view showing a central portion of FIG. 6A in an enlarged fashion. Light in the second wavelength range emitted from the second light source 720 is incident on the first dichroic mirror 140 at the second incident angle θ2 (for example, 55 degrees) which is larger than the first incident angle θ1 (for example, 25 degrees) and then passes through the first dichroic mirror 140.

Next, the light in the second wavelength range, which has passed through the first dichroic mirror 140, is incident on the second dichroic mirror 141 at a third incident angle θ3 (for example, 15 degrees) which is smaller than the first incident angle θ1 (for example, 25 degrees) and is then reflected by the second dichroic mirror 141. An angle θ4 formed by a plane of the first dichroic mirror 140 and a plane of the second dichroic mirror 141 is about 40 degrees.

The light in the second wavelength range, which is reflected by the second dichroic mirror 141, is incident on the first dichroic mirror 140 at the first incident angle θ1 (for example, 25 degrees and is then reflected by the first dichroic mirror 140. As a result, the light in the second wavelength range reflected by the first dichroic mirror 140 is incident on a collective lens 173 of a light source-side optical system 170.

The first incident angle θ1 (for example, 25 degrees), the second incident angle θ2 (for example, 55 degrees), and the third incident angle θ3 (for example, 15 degrees) are similar also in the first embodiment and the second embodiment. Further, the angle θ4 (about 40 degrees) formed by the plane of the first dichroic mirror 140 and the plane of the second dichroic mirror 141 is similar also in the first embodiment and the second embodiment.

Thus, according to the embodiments of the present invention, the light source unit 60 includes the first light source 710 configured to emit light in the first wavelength range, the second light source 720 configured to emit light in the second wavelength range, the luminescent body 110 configured to emit light in the third wavelength range, which is the wavelength range differing from those of light in the first wavelength range and light in the second wavelength range, by use of light in the first wavelength range as excitation light, and the first dichroic mirror 140 configured to reflect light in the first wavelength range and transmit light in the second wavelength range and light in the third wavelength range. The first light source 710, the second light source 720, and the luminescent body 110 are provided on one surface side of the first dichroic mirror 140, and light in the first wavelength and light in the second wavelength which are incident on the first dichroic mirror 140 are not parallel to each other.

As a result, the first dichroic mirror 140 can transmit or reflect the two types of light (the light in the first wavelength range and the light in the second wavelength range) whose incident angles differ based on their incident angles. Then, the luminescent body 110 emits light (light in the third wavelength range) whose wavelength range differs from that of the light (the light in the first wavelength range) which is incident on the first dichroic mirror 140 using the light (the light in the first wavelength range) reflected by the first dichroic mirror 140 as excitation light. Since the light (the light in the third wavelength range) emitted by the luminescent body 110 is transmitted through the first dichroic mirror 140, the light source unit 60 can emit the light (the light in the second wavelength range) which is transmitted through the first dichroic mirror 140 together with the light in the third wavelength range which is also transmitted through the first dichroic mirror 140, thus the light source unit 60 being able to emit the two types of light (the light in the second wavelength range and the light in the third wavelength range).

In addition, the light source unit 60 includes the first reflection mirrors 705 each having the first reflection plane formed thereon to reflect light in the first wavelength range and the second reflection mirrors 706 each having the second reflection plane formed thereon to reflect light in the second wavelength range, the second reflection plane being non-parallel to the first reflection plane. Alternatively, in the light source unit 60, the first light source 710 and the second light source 720 are disposed non-parallel to each other.

As a result, since the first reflection planes formed on the first reflection mirrors 705 and the second reflection planes formed on the second reflection mirrors 706 are non-parallel to each other, two types of light (light in the first wavelength range and light in the second wavelength range) can be made to be incident on the first dichroic mirror 140 at different incident angles. Even in the case of the light source unit 60 having no such reflection mirror, it is possible to obtain the same advantageous effect as that provided when the light source unit 60 includes the reflection mirrors described above by disposing the first light source 710 and the second light source 720 in such a manner as to be non-parallel to each other.

The light source unit 60 includes the half-wave plate 722 between either the first light source 710 or the second light source 720 and the first dichroic mirror 140. Light in the first wavelength range and light in the second wavelength range which are incident on the first dichroic mirror 140 are at right angles to each other in terms of polarization direction.

As a result, in two types of light (light in the first wavelength range and light in the second wavelength range) whose polarization directions are at right angles to each other, compared with two types of light whose polarization directions are the same, there may be a case where the difference in cuton wavelength C1 based on their incident angles on the first dichroic mirror 140 becomes large. As the difference in cuton wavelength C1 becomes larger, the selection range of wavelengths for the two types of light incident on the first dichroic mirror 140 becomes larger. In addition, since the half-wave plate 722 only needs to be provided for either of the first light source 710 and the second light source 720, the degree of freedom in laying out the relevant constituent elements within the light source unit 60 can be expanded.

In the light source unit 60, light in the first wavelength range is incident on the first dichroic mirror 140 at the first incident angle θ1, light in the second wavelength range is incident on the first dichroic mirror 140 at the second incident angle θ2, which is larger than the first incident angle θ1, and excitation light shone onto the luminescent body 110 is the light in the first wavelength range reflected by the first dichroic mirror 140.

As a result, light in the first wavelength range which is incident on the first dichroic mirror 140 at the small incident angle, which is the first incident angle θ1, can be reflected, while light in the second wavelength range which is incident on the first dichroic mirror 140 at the large incident angle, which is the second incident angle θ2, can be transmitted therethrough. Then, the light in the first wavelength range reflected by the first dichroic mirror 140 is shone onto the luminescent body 110 as excitation light, which is light in the third wavelength range.

In the light source unit 60, light in the first wavelength range and light in the second wavelength range pass through the diffuse plates before they are incident on the first dichroic mirror 140. As a result, the light source unit 60 can diffuse and shape properly the two types of light (the light in the first wavelength range and the light in the second wavelength range) so that the speckle noise of the light in the second wavelength range which is projected onto the projection target body and the luminous efficiency and service life of the luminescent body 110 are improved.

The light source unit 60 includes the third light source 310, which is configured to emit light in the fourth wavelength range which is the wavelength range differing from those of light in the first wavelength range to light in the third wavelength range, and the second dichroic mirror 141, which is configured to reflect the light in the second wavelength range which has passed through the first dichroic mirror 140 and transmit the light in the fourth wavelength range. As a result, the light source unit 60 can emit another type of light (light in the fourth wavelength range) in addition to the two types of light (light in the second wavelength range and light in the third wavelength range).

In the light source unit 60, the first dichroic mirror 140 transmits light in the second wavelength range which is incident thereon at the second incident angle θ2 and reflects the light in the second wavelength range which is reflected by the second dichroic mirror 141 and is then incident thereon at the first incident angle θ1. Additionally, the first dichroic mirror 140 reflects the light in the fourth wavelength range which has passed through the second dichroic mirror 141 and combines the light in the second wavelength range to the light in the fourth wavelength range into the same optical path. As a result, the light source unit 60 can combine the three types of light (the light in the second wavelength range to the light in the fourth wavelength range) into the same optical path for emission therefrom.

In the light source unit 60, the first light source 710 to the third light source 310 emit light in the first wavelength range, light in the second wavelength range, and light in the fourth wavelength range, respectively, in a time-sharing fashion. As a result, the light source unit 60 can add and mix the three types of light emitted from the first light source 710 to the third light source 310 through additive color mixing.

In the light source unit 60, light in the first wavelength range is light in the blue wavelength range or ultraviolet light, light in the second wavelength range is light in the blue wavelength range, light in the third wavelength range is light in the green wavelength range, and light in the fourth wavelength rage is light in the red wavelength range. As a result, the light source unit 60 can prepare green light from blue light or ultraviolet light and emit light of various colors by using the three primary colors of green so generated, blue and red and mixing the three primary colors.

In the light source unit 60, the first dichroic mirror 140 is rotatable on the rotating shaft provided in the predetermined position. As a result, the incident angles of light in the first wavelength range and light in the second wavelength range can be set at the first incident angle θ1 and the second incident angle θ2, respectively, without the reflection mirrors.

In the embodiments, the first dichroic mirror 140 is described as being configured to reflect light in the first wavelength range which is incident thereon at the first incident angle θ1, which is, for example, 25 degrees and transmit light in the second wavelength range which is incident thereon at the second incident angle θ2 larger than the first incident angle θ1, which is, for example, 55 degrees; however, the present invention is not limited thereto. The first dichroic mirror 140 may be configured to transmit light in the first wavelength range which is incident thereon at the first incident angle θ1 and reflect light in the second wavelength range which is incident thereon at the second incident angle θ2 larger than the first incident angle θ1.

In the light source unit 60, at least either the first reflection mirrors or the second reflection mirrors can be adjusted in position or inclination angle. As a result, the incident angle of light in the first wavelength range and/or light in the second wavelength range which is incident on the first dichroic mirror 140 can be adjusted and changed by moving the movable reflection mirrors variously. Further, since light from all the blue laser diodes 71 making up the first light source 710 can be caused to be incident on the first dichroic mirror 140 at the first incident angle θ1 so as to be reflected towards the luminescent body 110 by moving the movable reflection mirrors variously, light in the third wavelength range emitted from the luminescent body 110 can be made use of as brighter light. In addition, since light from all the blue laser diodes 71 making up the second light source 720 can be caused to be incident on the first dichroic mirror 140 at the second incident angle θ2 so as to be transmitted therethrough by moving the reflection mirrors variously, light from all the blue laser diodes 71 can be made use of as blue light.

Thus, with the configuration that has been described heretofore, the light source unit 60 can be obtained which is simple in configuration and is small in size. Then, by installing the light source unit 60 so obtained, the display device 50 and the projection optical system 220, the projector control unit, and the like, the projector 10 can be obtained which is small in size.

While the embodiments of the present invention have been described heretofore, the embodiments are presented as an example, and hence, there is no intention to limit the scope of the present invention by the embodiments. The novel embodiments can be carried out in other various forms, and various omissions, replacements and modifications can be made thereto without departing from the spirit and scope of the present invention. Those resulting embodiments and their modifications are included in the scope and gist of the present invention and are also included in the scope of inventions claimed for patent under claims below and their equivalents.

What is claimed is:

1. A light source unit comprising:
    a first light source configured to emit light in a first wavelength range;
    a second light source configured to emit light in a second wavelength range;
    a first dichroic mirror configured to reflect the light in the first wavelength range incident thereon at a first incident angle and transmit the light in the second wavelength range incident thereon at a second incident angle; and
    a second dichroic mirror configured to reflect the light in the second wavelength range that has passed through the first dichroic mirror, wherein
    after having been reflected by the second dichroic mirror, the light in the second wavelength range is incident on the first dichroic mirror to then be reflected by the first dichroic mirror.

2. The light source unit according to claim 1, wherein the second incident angle is different from the first incident angle.

3. The light source unit according to claim 2, wherein the second incident angle is larger than the first incident angle.

4. The light source unit according to claim 1, wherein the light in the first wavelength range is equal to the light in the second wavelength range.

5. The light source unit according to claim 1, comprising further:
    a luminescent body configured to emit light in a third wavelength range by using the light in the first wavelength range reflected by the first dichroic mirror as excitation light, a wavelength range of the light in the third wavelength range differing from those of the light in the first wavelength range and the light in the second wavelength range, wherein
    the first dichroic mirror transmits the light in the third wavelength range.

6. The light source unit according to claim 5, wherein the first light source, the second light source, and the luminescent body are provided on one surface side of the first dichroic mirror.

7. The light source unit according to claim 5, wherein the excitation light shone onto the luminescent body is the light in the first wavelength range reflected by the first dichroic mirror.

8. The light source unit according to claim 5, comprising further:
    a third light source configured to emit light in a fourth wavelength range which is a wavelength range differing from those of the light in the first wavelength range to the light in the third wavelength range, wherein
    the second dichroic mirror transmits the light in the fourth wavelength range.

9. The light source unit according to claim 8, wherein the first dichroic mirror reflects the light in the fourth wavelength range which has passed through the second dichroic mirror and combines the light in the second wavelength range to the light in the fourth wavelength range into a same optical path.

10. The light source unit according to claim 8, wherein the first light source to the third light source emit the light in the first wavelength range, the light in the second wavelength range, and the light in the fourth wavelength range, respectively, in a time-sharing fashion.

11. The light source unit according to claim 8, wherein the light in the first wavelength range is light in a blue wavelength range or ultraviolet light, wherein
    the light in the second wavelength range is light in a blue wavelength range, wherein
    the light in the third wavelength range is light in a green wavelength range, and wherein
    the light in the fourth wavelength range is light in a red wavelength range.

12. The light source unit according to claim 1, comprising:
    a first reflection mirror having a first reflection plane formed thereon to reflect the light in the first wavelength range; and a second reflection mirror having a second reflection plane formed thereon to reflect the light in the second wavelength range and disposed non-parallel to the first reflection plane, or wherein
    the first light source and the second light source are disposed non-parallel to each other.

13. The light source unit according to claim 1, wherein the first dichroic mirror can move on a rotating shaft provide in a predetermined position.

14. A projection control comprising:
    the light source unit according to claim 1;
    a display device onto which light from the light source unit is shone to thereby form image light;
    a projection optical system configured to project the image light emitted from the display device onto a projection target body; and
    a projection control unit configured to control the display device and the light source unit.

15. A light source unit comprising:
a first light source configured to emit light in a first wavelength range;
a second light source configured to emit light in a second wavelength range;
a first dichroic mirror configured to reflect the light in the first wavelength range incident thereon at a first incident angle and transmit the light in the second wavelength range incident thereon at a second incident angle; and
a half-wave plate provided between either of the first light source or the second light source and the first dichroic mirror, wherein
a polarization direction of the light in the first wavelength range and a polarization direction of the light in the second wavelength range are at right angles to each other with respect to the first dichroic mirror.

16. A projection control comprising:
the light source unit according to claim 15;
a display device onto which light from the light source unit is shone to thereby form image light;
a projection optical system configured to project the image light emitted from the display device onto a projection target body; and
a projection control unit configured to control the display device and the light source unit.

* * * * *

UNITED STATES PATENT AND TRADEMARK OFFICE
CERTIFICATE OF CORRECTION

PATENT NO. : 12,001,130 B2
APPLICATION NO. : 17/898217
DATED : June 4, 2024
INVENTOR(S) : Osamu Umamine Page 1 of 1

It is certified that error appears in the above-identified patent and that said Letters Patent is hereby corrected as shown below:

In the Claims

In Column 19, Claim 5, Lines 64-65, delete "comprising further:" and insert -- further comprising: --, therefor.

In Column 20, Claim 8, Lines 17-18, delete "comprising further:" and insert -- further comprising: --, therefor.

In Column 20, Claim 13, Line 58, delete "provide" and insert -- provided --, therefor.

Signed and Sealed this
Seventh Day of January, 2025

Derrick Brent
*Acting Director of the United States Patent and Trademark Office*